No. 711,335. Patented Oct. 14, 1902.
L. E. McCAHAN.
HARVESTER.
(Application filed Nov. 30, 1901.)
(No Model.) 5 Sheets—Sheet 5.
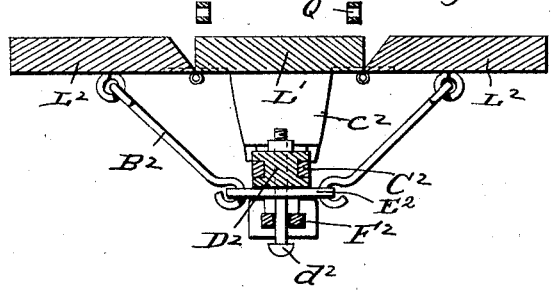
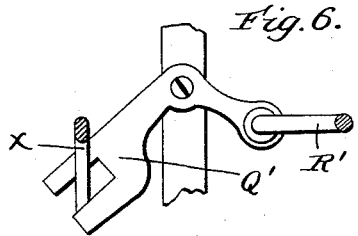
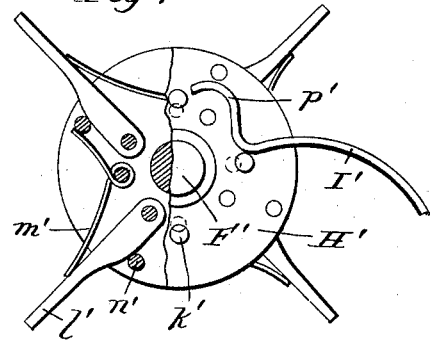
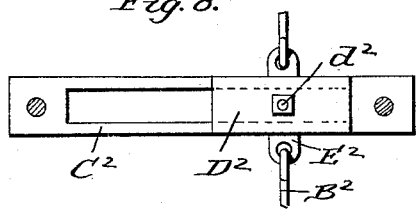
Witnesses
Inventor
Attorney

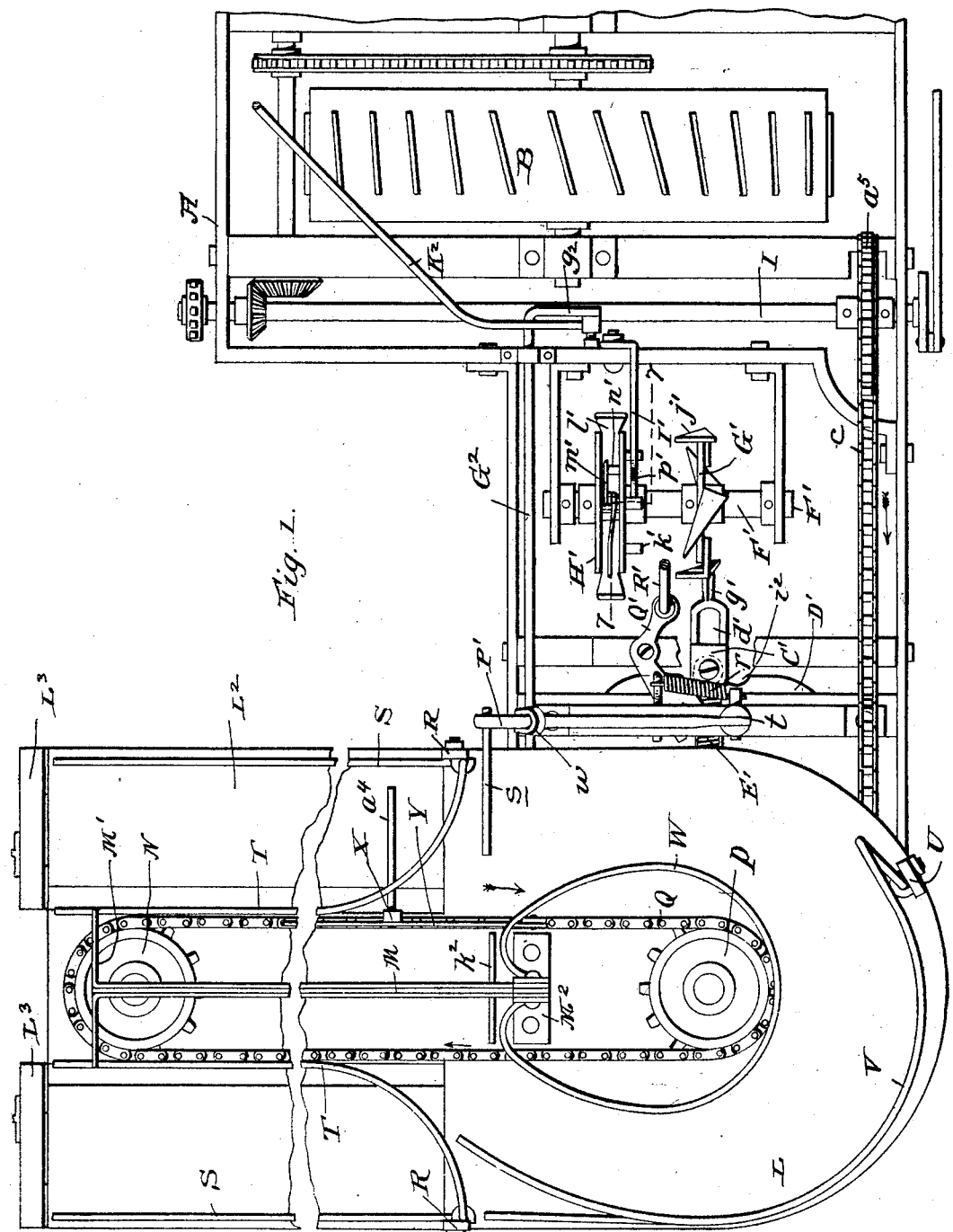

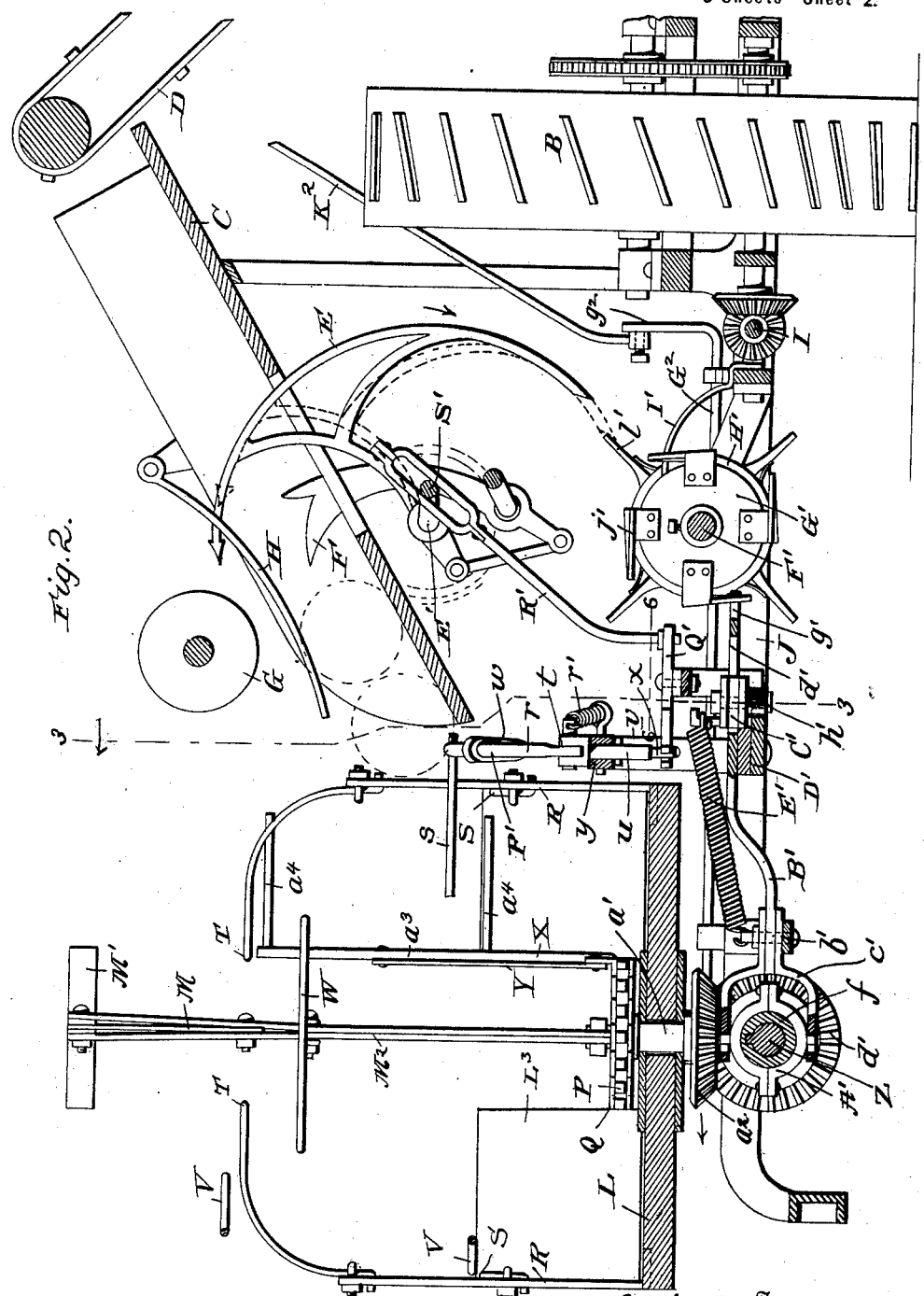

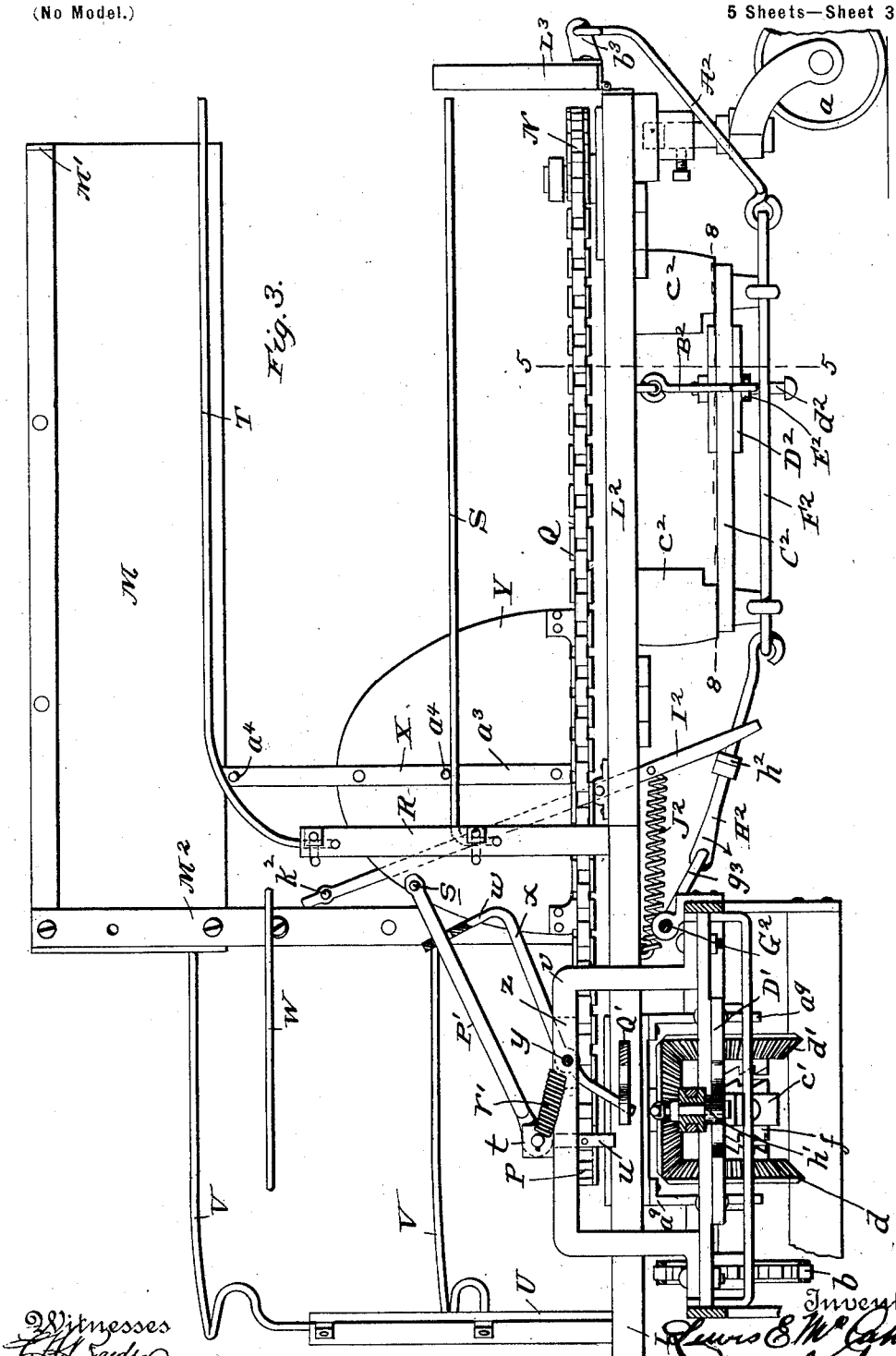

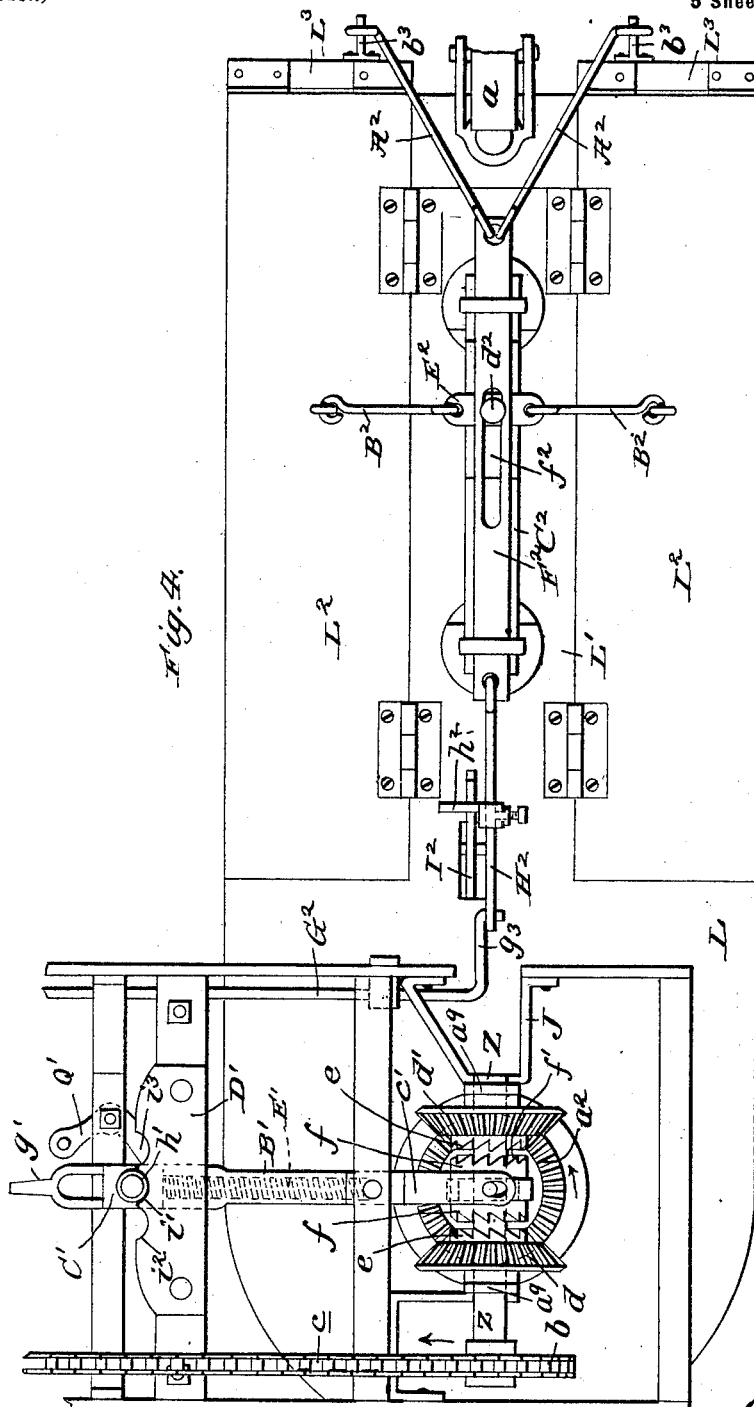

UNITED STATES PATENT OFFICE.

LEWIS E. McCAHAN, OF YORK, NEBRASKA.

HARVESTER.

SPECIFICATION forming part of Letters Patent No. 711,335, dated October 14, 1902.

Application filed November 30, 1901. Serial No. 84,219. (No model.)

*To all whom it may concern:*

Be it known that I, LEWIS E. MCCAHAN, a citizen of the United States, residing at York, in the county of York and State of Nebraska, have invented new and useful Improvements in Harvesters, of which the following is a specification.

My invention relates to improvements in self-binding grain-harvesters; and it has for its general object to provide an attachment for such harvesters calculated to receive the recumbent sheaves or bundles of grain from the harvester deck-board, lift the same on end, adjust or place them in a shock, and when operated by the harvester attendant or another person discharge the shock so formed in a standing position on the ground.

With the foregoing in mind the invention will be fully understood from the following description and claims when taken in conjunction with the annexed drawings, in which—

Figure 1 is a plan view illustrating a portion of a self-binding grain-harvester equipped with my improved shocker; Fig. 2, a transverse section of the same; Fig. 3, a longitudinal vertical section taken in the plane indicated by the line 3 3 of Fig. 2 looking in the direction indicated by arrow; Fig. 4, an inverted plan view illustrating the platform of the shocker and the appurtenances thereof; Fig. 5, a detail transverse section taken in the plane indicated by the line 5 5 of Fig. 3; Fig. 6, a detail horizontal section taken in the plane indicated by the line 6 6 of Fig. 2; Fig. 7, a slightly-enlarged detail section taken in the plane indicated by the line 7 7 of Fig. 1, and Fig. 8 a detail section taken in the plane indicated by the line 8 8 of Fig. 3.

In the said drawings similar letters of reference designate corresponding parts in all of the several views, referring to which—

A is a portion of the main frame of a self-binding grain-harvester; B, the bull or main traveling wheel thereof; C, the deck-board; D, the draper for conveying the cut grain to the deck-board, and E, E', F, G, and H the needle, the needle-shaft, the packer or packers, the knotter, and the guide, respectively, of a binding mechanism. This binding mechanism is similar in construction to the ordinary well-known Appleby binding mechanism; but I desire it distinctly understood that the binding mechanism as well as the harvester proper as a whole may be of any suitable construction without involving a departure from the scope of my invention.

I is the sickle-shaft of the harvester, which may and preferably does derive its motion from the wheel B after the usual manner; J, the main frame of my improved shocker, which is connected to and arranged at one side of the harvester-frame and supported thereby; L, the platform of the shocker, which is connected to the frame J and has a comparatively narrow portion L' extending in rear thereof and supported by a caster-wheel $a$ or other means; $L^2 L^2$, normally horizontal drop-leaves connected in a hinged manner to and disposed at opposite sides of the narrow platform portion; $L^3 L^3$, normally upright guards connected in a hinged manner to the rear ends of the leaves $L^2$ and having for their purpose to hold sheaves or bundles of grain against falling off the rear ends of the leaves; M, a longitudinal vertical partition disposed above the longitudinal center of the platform portion L' and having lateral arms M' at its rear end designed to assist in preventing sheaves or bundles of grain from toppling off the rear end of the platform; $M^2$, the upright support of the partition M, which is connected to and rises from the platform L and is provided with a plurality of bolt-holes, as shown, to permit of the partition being bolted to it at a height suited to the length of the grain to be harvested; N, a sprocket-wheel mounted on a post rising from the platform portion L', adjacent to the rear end thereof; P, a sprocket-wheel fixed on a vertical shaft $a'$, journaled in the forward portion of the platform L and provided below the same with a miter-gear $a^2$; Q, a sprocket-belt which takes around the sprocket-wheels N P; R R, uprights which rise from the main platform portion L, at the rear corners thereof; S S, longitudinal bars supported by and extending rearwardly from the uprights R in vertical planes approximately the same as those of the outer edges of the leaves $L^2$ and having for their purpose to prevent sheaves or bundles of grain from falling laterally off said leaves; T T, resilient rods which extend upwardly, inwardly, and rearwardly from the uprights R and have for their purpose to press the upper portions of the sheaves or bundles of grain at opposite sides of the partition M inwardly, and thereby insure the upper ends of the two parallel sets of sheaves or bundles resting together when the shock is discharged on the ground; U, an upright connected to and rising from the platform, at or adjacent to the forward edge thereof; V V, lower and upper curvilinear spring-rods which are connected to the upright U and extend outwardly and rearwardly therefrom to points adjacent to the outer upright R; W, a guide, preferably in the form of a bowed spring-rod, connected at its ends to the upright $M^2$ and designed, in conjunction with the rods V and also in conjunction with the rods T, to retard—i. e., prevent—a too-free rearward movement of, and thereby hold up, the sheaves or bundles of grain at opposite sides of the partition or divider M; X, a follower on the chain Q, which in the preferred embodiment of the invention comprises an upright $a^3$, connected to the chain, and two (more or less) arms $a^4$, extending outwardly from said upright; Y, a resilient shield connected to the chain-and-follower upright $a^3$, extending in front and rear of the follower and having for its purpose to hold the sheaves or bundles of grain in position while the follower is pressing the same rearwardly between the guide W and the inner rod T or between the said guide W and the rods V and outer rod T; Z, a short longitudinally-disposed shaft which is journaled in the outer portion of the frame J, is continuously rotated when the harvester is at work by the sickle-shaft I through the medium of sprocket-wheels $a^5$ and $b$ and chain $c$, Figs. 1 and 4, is equipped with loose miter-gears $d$ $d'$, intermeshed with the miter-gear $a^2$ on shaft $a'$ and having inner ratchet-faces $e$, and is also equipped with an endwise-movable sleeve $f$, keyed or splined thereon between the gears $d$ $d'$ and having ratchet-faces $f'$ complementary to the faces $e$ of said gears; A', Fig. 2, a collar loosely arranged in a circumferential groove of the sleeve $f$; B', a horizontal lever fulcrumed at $b'$ on frame J and having a yoke $c'$ at its outer end in engagement with studs of the collar A', a longitudinal slot $d'$ adjacent to its inner end, and an inner reduced end $g'$ of inverted-V form in cross-section; C', a slide held to and movable longitudinally on the slotted portion of the lever B' and carrying an antifriction-roller $h'$; D', Figs. 1, 2, and 4, a plate fixed to the frame J and having seats $i'$, $i^2$, and $i^3$ in its inner edge to receive the roller $h'$; E', a coiled spring connected at one end to the lever B', at a point approximately coincident with the fulcrum-point thereof, and at its opposite end to the slide C' on said lever; F', a longitudinally-disposed shaft journaled in frame J adjacent to the inner end of lever B'; G', a wheel fixed on said shaft and bearing four (more or less) cam-tappets $j'$, alternately disposed in opposite directions and arranged to engage the end $g'$ of lever B' and alternately throw said lever in opposite directions; H', Figs. 1, 2, and 7, a wheel also fixed on the shaft F' and having four (more or less) lateral projections $k'$ and four (more or less) radial blades $l'$, normally held by springs $m'$ against stops $n'$ and arranged in the path of the heel of the needle E and adapted to be engaged by said heel incident to about the last four inches of its travel home—i. e., in the direction indicated by arrow in Fig. 2—and also adapted to give or swing inwardly against the action of the springs $m'$ on the outward stroke of the needle, so as not to interfere with said stroke, and I' a spring connected to the frame J and having a hook $p'$, arranged to engage the lateral projections $k'$ of wheel H', so as to properly limit the movement of the wheels H' G' incident to each operative engagement of the needle E with a blade $l'$ of the former and hold said wheels H' G' against casual movement during the outward stroke of the needle E and at other times.

A sheaf or bundle lifter P', presently described in detail, is arranged, while inclined upwardly and rearwardly, to receive the recumbent sheaves or bundles of grain from the deck-board C of the harvester and is so timed in its movements as to raise and set the sheaves on end on the shocker-platform L at the time or approximate time that the sprocket-belt Q, shield Y, and follower X are set in motion. From this it follows that the follower will take the sheaf or bundle of grain from the lifter and move the same rearwardly before it, either between the guide W and the inner rod T or between the said guide W and the rods V and outer rod T, according to the direction in which the belt Q, shield Y, and follower X are traveling. Said belt, shield, and follower are caused to alternately move in opposite directions around the guide W, as will be presently understood, and hence it will be seen that after a short period of operation the spaces between the partition or divider M and the inner and outer rods T and retaining-bars S will be occupied by parallel lines of sheaves, this because when the follower presses against a sheaf or bundle it will through said sheaf or bundle push rearwardly the bundle or bundles in position on the platform before the same. When the said spaces are filled with bundles or sheaves of grain, as stated, the platform-leaves $L^2$ and guards $L^3$ are dropped by the harvester attendant and the two lines or rows of sheaves are caused to drop in an approximately upright position on the ground, with the upper ends or heads of the bundles of one row bearing against the upper ends or heads of the bundles of the other row, this latter because of the pressure exerted against the upper portions of the sheaves or bundles by the resilient rods T incident to the discharge of the shock, as before mentioned.

The operation of the belt Q, shield Y, and follower X—i. e., the manner in which they are moved to and fro around the guide W—is as follows: If it be remembered that the shaft Z is continuously rotated during the working of the harvester and assumed that the antifriction-roller $h'$ of lever $B'$ rests in the middle seat $i'$ of plate $D'$ and the sleeve $f$, connected to said lever, rests between and out of engagement with both of the gears $d$ $d'$, it will be readily understood that when the wheels $H'$ and $G'$ are turned by the needle E, as before described, and a right-hand cam-tappet $j'$ of the wheel $G'$ is engaged with the end $g'$ of lever $B'$ the inner arm of said lever will be swung toward the right and the antifriction-roller $h'$ removed from the middle seat $i'$ of keeper or plate $D'$ and placed in the seat $i^3$ thereof. At the same time the sleeve $f$ will be moved by the lever $B'$ endwise into engagement with the gear $d$, with the result that the gear $a^2$ will be rotated in the direction indicated by arrow in Figs. 2 and 4 and the belt Q, shield Y, and follower X caused to travel in the direction indicated by arrow in Fig. 1. Such movement of the belt, shield, and follower will, however, be sudden and of short duration, because the resistance which the bundle or sheaf before the follower offers to the progress of the same operates to thrust back the follower, the belt, and the gears $a^2$ and $d$, and by reason of the beveled ratchet-teeth on the gear $d$ and sleeve $f$ move the said sleeve $f$ against the action of the spring $E'$ toward the right and the inner arm of the lever toward the left until the sleeve rests between and out of engagement with both gears $d$ $d'$ and the antifriction-roller $h'$ rests in the middle seat $i'$ of keeper D, which are the assumed positions of said sleeve and lever before mentioned. The belt Q, shield Y, and follower X will remain in the position in which they are left by the stop motion described until the wheels $H'$ $G'$ are turned by the succeeding or next inward movement of the needle E, when a left-hand cam-tappet $j'$ of wheel $G'$ will engage the end $g'$ of lever $B'$, the inner arm of said lever will be swung toward the left, and the antifriction-roller $h'$ moved from the middle seat $i'$ of the keeper $D'$ to the seat $i^2$ thereof, the sleeve $f$ will be moved by lever $B'$ endwise into engagement with the gear $d'$, the gear $a^2$ will be rotated in the direction opposite to that indicated by arrow in Figs. 2 and 4, and the belt Q, shield Y, and follower X caused to travel in the direction opposite to that indicated by arrow in Fig. 1. This latter movement of the parts will continue until the back thrust against follower X is sufficient to overcome the spring $E'$, when it will move the ratchet-face of sleeve $f$ out of engagement with the ratchet-face of gear $d'$ and return said sleeve and the lever $B'$ to the position shown in Figs. 1 and 4. Subsequent to this the operation is as described, and in consequence the belt, shield, and follower are first moved in one direction and then in the other for the purpose stated.

The sheaf or bundle lifter $P'$, before mentioned, comprises, by preference, and as best shown in Figs. 2 and 3, a rod $r$, having one or more angular arms $s$. Said rod is connected at $t$ and in a hinged manner to a vertical post $u$, journaled in a standard $v$ on frame J, and in consequence is free to turn with the post on the axis of the latter and swing backward and forward on the post. It is also journaled at about the distance shown above the post $u$ in the angular arm $w$ of a lever $x$, which latter is fulcrumed at $y$ in a slot $z$ of standard $v$. By virtue of this construction and a coiled spring $r'$, interposed between and connected to lateral projections on the post $u$ and standard $v$, the bundle-lifter $P'$ is normally held in a rearwardly-inclined position, with its arms $s$ directed across the platform L, and it will also be observed that when the bundle-lifter is swung upwardly into a position in vertical coincidence with the post $u$ by means presently described to stand a bundle on end in the path of the follower X and the follower X is moving rearwardly toward the bundle-lifter the said bundle-lifter is free to turn on the axis of the post $u$ rearwardly and outwardly, so as to enable the bundle to pass the same. When the bundle has passed the arm $s$ of the lifter, the spring $r'$ will operate to return the lifter to the normal position shown in Figs. 2 and 3, with its arm extending across platform L.

In engagement with the lower arm of the lever $x$ is the bifurcated arm of a bell-crank lever $Q'$, which is fulcrumed on the frame J and has its opposite or inner end connected by suitable means, as a slotted pitman $R'$, with a crank $S'$ of the needle-shaft $E'$, the slot of the pitman receiving the crank of the shaft, as shown. By virtue of this construction it will be observed that incident to the inward stroke of the needle E the lifter $P'$ will be raised to an upright or approximately upright position to stand a bundle of grain thereon in an upright position on the platform L and incident to the opposite or outward movement of the needle will be returned to its normal rearwardly-inclined position ready to receive another bundle from the deck-board C.

Referring now to Figs. 3, 4, 5, and 8, $A^2$ $A^2$ are links connected to angular arms $b^3$ on the rear guards $L^3$; $B^2$ $B^2$, links connected to the under sides of the normally horizontal leaves $L^2$; $C^2$, a longitudinal slotted bar fixedly connected by hangers $c^2$ to the under side of the platform portion $L'$; $D^2$, a slide movable fore and aft in the slot of bar $C^2$ and having a bolt $d^2$ journaled in and depending from it; $E^2$, a cross-head fixed at its middle on the bolt $d^2$, so as to turn therewith, and connected at its ends to the inner ends of the links $B^2$; $F^2$, a longitudinal bar movable endwise in guides on the hangers $c^2$ below the fixed bar $C^2$ and having its rear end connected to the links $A^2$ and also having a longitudinal slot $f^2$, receiving the bolt $d^2$; $G^2$, a rock-shaft journaled in bearings on the frame J at right angles to the bar $F^2$ and having inner and outer cranks $g^2$ $g^3$, Fig. 1; $H^2$, a link connecting the forward end of bar $F^2$ and the outer crank $g^3$ of shaft $G^2$ and having an enlargement $h^2$ at an intermediate point of its length; $I^2$, a lever extending through a slot in and fulcrumed at $j^2$ on the platform portion $L'$ and having a T-head $k^2$ on its upper arm and also having its lower arm disposed in rear of the enlargement $h^2$ of link $H^2$, and $J^2$ a coiled spring interposed between and connected to the lower arm of the lever $I^2$ and the platform L. To the inner crank $g^2$ of rock-shaft $G^2$ is connected a rod $K^2$, Fig. 1. This rod is designed to be connected to the lever (not shown) by which the sheaf-carrier of an ordinary harvester is controlled, and it will be readily understood that when the said lever is made fast by the harvester attendant the leaves $L^2$ and rear guards $L^3$ of the shocker-platform will be supported and securely held in a horizontal position and an upright position, respectively. When, however, said lever is released, the spring $J^2$ will operate to suddenly draw the lower arm of the lever $I^2$ and the bar $F^2$ forwardly, with the result that the rear guards $L^3$ will be drawn down into a horizontal position in line with the leaves $L^2$ and the rear end wall of the slot $f^2$ in bar $F^2$ will strike the bolt $d^2$ and move the cross-head $E^2$ forward of the transverse plane of the connections of the links $B^2$ to the leaves $L^2$, when said leaves will by reason of their own weight and the sheaves or bundles of grain thereon drop after the manner of a deadfall. Such sudden dropping of the leaves $L^2$ will obviously place the shock formed on the leaves in the manner before described in an upright position on the ground, and in this the leaves $L^2$ are assisted by the upper arm of the lever $I^2$, which when the lower arm is pulled forwardly, as stated, is thrown rearwardly and by pressing in such direction against the shock prevents it from tilting forwardly when it is deposited on the ground. Immediately subsequent to the discharge of the shock the harvester attendant manipulates the lever mentioned as connected with the rock-shaft $G^2$ so as to rock said shaft in a direction to raise the outer crank $g^3$. When the said crank is raised, as stated, the bar $F^2$ will be thrust rearwardly and the links $A^2$ rearwardly and upwardly, with the result that said links will raise the guards $L^3$ to their normal vertical position and through the medium of said guards raise the leaves $L^2$ to their normal horizontal position. Incident to the raising of the leaves $L^2$ the links $B^2$ will draw the cross-head $E^2$ rearwardly to the position shown in Fig. 4 in the same transverse plane as the connections of the links $B^2$ to the leaves $L^2$, when said links will obviously assist in supporting the leaves. The lever mentioned as connected to the rod $K^2$—i. e., the lever by which the sheaf-carrier of an ordinary harvester is controlled—is made fast after the rod $F^2$ is thrust rearwardly, when said rod $F^2$, the links $B^2$ $A^2$, leaves $L^2$, and guards $L^3$ will be secured in the positions shown in Fig. 3.

It will be appreciated from the foregoing that by reason of my improvements the bundles subsequent to the tying thereof are automatically raised from a recumbent position and stood on end and then placed or adjusted into a shock, also that the attendant is enabled to quickly and easily deposit the shock on the ground with the assurance that it will stand in an upright position thereon and as quickly and easily return the drop-leaves and rear guards of the platform to and secure them in their normal position to adapt the platform to receive another shock.

The present is the preferred embodiment of my invention, and I have entered into a detailed description of the construction and relative arrangement of its parts in order to impart a definite understanding of the same. I do not desire, however, to be understood as confining myself to such construction or arrangement of parts, as various changes or modifications may be made without departing from the scope of my claims.

It will be observed that while the shocker-platform L is securely fastened to the harvester-frame it is free to trail independent of the side motion of harvester, this because it is fitted with swivel bolsters $a^9$, Figs. 3 and 4, receiving the shaft Z.

Having described my invention, what I claim, and desire to secure by Letters Patent, is—

1. The combination of a harvester, a vertically-swinging lever, a bundle-lifter journaled in the lever, and mounted so as to swing vertically with the lever, and, when in an upright position, turn on its axis in said lever; said lifter being disposed at the delivery end of the harvester to receive, while in a recumbent position, a recumbent bundle of grain from the harvester, and means for operating the lever.

2. The combination of a harvester, a vertically-swinging lever, a vertical post mounted to turn on its axis, a bundle-lifter pivotally connected to the post so as to swing vertically thereon, and journaled in the lever; said lifter being disposed at the delivery end of the harvester to receive recumbent bundles of grain from the harvester and stand the same on end, a spring connected to and adapted to turn the vertical post in one direction, and means for operating the lever.

3. The combination of a harvester, a shock-support, a follower movable in opposite directions on the support, a bundle-standing device disposed at the delivery end of the harvester to receive, while in a recumbent position, a recumbent bundle of grain from the harvester; said device being mounted so as to swing vertically and turn on its axis or swing horizontally, and means for moving said device.

4. The combination of a harvester, comprising a binding mechanism, a bundle-lifter arranged at the delivery end of the harvester to receive a recumbent bundle of grain from the harvester and stand the same, and an operating connection intermediate of the needle-shaft of the harvester binding mechanism and the bundle-lifter.

5. The combination of a harvester comprising a binding mechanism, a vertically-swinging lever, an operating connection intermediate of the needle-shaft of the binding mechanism and the lever for swinging the latter, and a bundle-lifter journaled in the lever and arranged at the delivery end of the harvester to receive a recumbent bundle of grain from the harvester, said lifter being mounted so as to swing from a recumbent position to an upright position with the lever and turn on its axis in said lever.

6. The combination of a harvester comprising a binding mechanism, a vertically-swinging lever fulcrumed at an intermediate point of its length, a vertical post mounted to turn on its axis, a spring for turning the post in one direction, a bundle-lifter pivotally connected to the post so as to swing vertically thereon and journaled in the upper arm of the lever; said lifter being disposed at the delivery end of the harvester to receive recumbent bundles of grain from the harvester and stand the same on end, a bell-crank engaging the lower arm of the lever, and an operating connection between the binding mechanism of the harvester and said bell-crank.

7. A shocker comprising a support or platform, a partition-wall thereon, a horizontally-movable belt, an upright follower connected and movable with the belt around one end of the partition, and means for moving the belt in different directions alternately.

8. A shocker comprising a support or platform, a partition-wall thereon, a horizontally-movable belt, an upright follower connected and movable with the belt around one end of the partition, and mechanism for transmitting motion to the belt comprising automatic stop-motion means controlled by the back thrust offered to the progress of the follower, whereby the carrier and follower are caused by such back thrust to dwell.

9. A shocker comprising a support or platform, an upright wall thereon, a follower movable at one side of the upright wall, means for operating the follower, a drop-leaf connected to one side of the support or platform, a guard hinged to and normally extending upwardly from the rear end of the drop-leaf, means for normally holding the drop-leaf and guard in a horizontal position and an upright position, respectively, and means for releasing the same.

10. A shocker comprising a support or platform, a divider or partition and bundle-retaining means on the support, drop-leaves connected to opposite longitudinal edges of the support, guards connected in a hinged manner to and normally extending upwardly from the rear ends of the drop-leaves, means for normally holding the drop-leaves and the guards in a horizontal position and an upright position, respectively, and means for releasing said drop-leaves and guards and permitting them to fall.

11. The combination of a harvester comprising a deck and binding mechanism, a swinging bundle-lifter arranged at the delivery end of the deck to receive a recumbent bundle of grain from the deck and stand the same, a lever connected with said lifter, and a connection between the lever and the binding mechanism.

12. The combination of a harvester comprising a deck, and binding mechanism, a swinging bundle-lifter arranged at the delivery end of the deck to receive a recumbent bundle of grain from the deck and stand the same, a lever connected with said lifter above the center of movement thereof, a bell-crank arranged to impart motion to said lever, and a driving connection between the needle-shaft and the bell-crank for rocking the latter.

13. The combination of a harvester, a shock-support, a follower movable on the said support, means for moving the follower, a bundle-lifter mounted to swing up and down in the path of the follower, and turn toward and from the same, and arranged to receive a bundle of grain from the harvester and stand the same on end on the shock-support and in the path of the follower, and means for operating said bundle-lifter.

14. A shocker comprising a support or platform, a partition-wall thereon, a follower movable around one end of the partition-wall, means for operating the follower, drop-leaves connected to opposite longitudinal edges of the support, guards connected in a hinged manner to and normally extending upwardly from the rear ends of the drop-leaves, a longitudinally-movable bar disposed below the platform, links connecting said bar and the drop-leaves, links connecting the bar and the guards, and means for operating the bar.

15. The combination of a harvester comprising a binding mechanism, a shock-support, a follower movable on said support, means for moving the follower, an upright post arranged to turn on its axis, a bundle-lifter pivoted on the post so as to swing vertically in the path of the follower, and turn with the post on the axis of the latter, and arranged at the delivery end of the harvester to receive a recumbent bundle of grain from the harvester and stand the same on the shock-support, a lever arranged to swing vertically at the side of the path of the follower and having an aperture in its upper arm in which the bundle-lifter is journaled and rendered free to turn axially in the lever, a bell-crank engaged with the lower arm of said lever, and a connection between the binding mechanism and said bell-crank for moving the latter by the former.

16. A shocker comprising a support or platform, drop-leaves connected to opposite longitudinal edges of the support, guards connected in a hinged manner to and normally extending upwardly from the rear ends of the drop-leaves, a longitudinally-movable bar disposed below the platform, links connecting said bar and the drop-leaves, links connecting the bar and the guards, bundle-retaining means on the support or platform, an upright lever fulcrumed at an intermediate point of its length on the support or platform, and having its lower arm connected with the longitudinal bar, and its upper arm provided with a head, a spring connected to the lower arm of the lever and tending to draw the same forwardly, and means for operating the longitudinal bar.

17. The combination of a harvester comprising a binding mechanism, a shock-support, a bundle-lifter arranged at the delivery end of the harvester to receive the recumbent bundles of grain and stand the same on the support, means intermediate of the binding mechanism of the harvester and the bundle-lifter for operating the latter, a follower movable on the shock-support, and means controlled by the binding mechanism of the harvester for moving the follower.

18. The combination of a harvester, a shock-support, a follower movable on the said support, means for moving the follower, an upright post arranged to turn on its axis, a lever arranged to swing vertically and parallel to the path of the follower, means for moving said lever, and a bundle-lifter journaled in the lever and pivoted on the post so as to swing vertically with the lever and in the path of the follower, and turn with the post on the axis of the latter; said bundle-lifter being arranged at the delivery end of the harvester to receive a recumbent bundle of grain from the harvester and stand the same on the shock-support.

19. The combination of a harvester comprising a binding mechanism, a shock-supporting platform arranged at the delivery end of the harvester, a partition or divider and bundle-retaining means at opposite sides of the partition; said partition and retaining means being mounted on the platform, drop-leaves hinged to opposite edges of the platform, guards hinged to the rear ends of the drop-leaves, means controlling said drop-leaves and guards, a belt movable horizontally on the platform, an upright follower connected and movable with the belt, means intermediate of the harvester and belt and controlled by the harvester binding mechanism for moving the belt alternately in opposite directions and causing it to dwell after each movement, a bundle-lifter arranged to receive recumbent bundles of grain from the harvester and stand the same on the platform, and means intermediate of the harvester binding mechanism and the bundle-lifter for operating the latter.

20. A shocker comprising a support or platform, an upright wall mounted thereon and having a lateral arm at its rear, a drop-leaf connected to the platform, a guard hinged to and normally extending upward from the rear end of the drop-leaf, a spring-retainer for holding bundles of grain on the drop-leaf and exerting inward pressure against the upper portion of said bundles, and suitable means for controlling the drop-leaf and guard.

21. The combination of a harvester comprising a binding mechanism, a shock-support arranged at the delivery end of the harvester to receive the bundles of grain discharged by the harvester, a follower movable on the support, and means intermediate of the harvester and the follower, and controlled by the binding mechanism of the harvester, whereby said follower is moved by the harvester.

22. A shocker comprising a support or platform, an upright wall mounted thereon and having a lateral arm at its rear, a drop-leaf connected to the platform, a guard hinged to and normally extending upward from the rear end of the drop-leaf, a spring-retainer for holding bundles of grain on the drop-leaf and exerting inward pressure against the upper portion of said bundles, an upright lever fulcrumed at an intermediate point of its length on the support or platform and having an upper arm adapted to press the bundles of grain rearwardly, a connection between the lower arm of said lever and the drop-leaf and guard, a spring adapted to draw the lower arm of the lever forwardly, and means for normally securing the drop-leaf and guard in a horizontal position and an upright position, respectively.

23. The combination of a harvester, comprising a binding mechanism, a shock-support arranged at the delivery end of the harvester to receive the bundles of grain discharged by the harvester, a follower movable on the support, and means controlled by the binding mechanism of the harvester for moving the follower.

24. A shocker comprising a support or platform, an upright divider mounted thereon and having oppositely-directed lateral arms at its rear, drop-leaves connected to opposite edges of the platform, guards hinged to and normally extending upward from the rear ends of the drop-leaves, spring-actuated means connected with the drop-leaves and guards and arranged to press the bundles of grain rearwardly at the time of discharge, spring-retainers for holding bundles of grain on the drop-leaves and exerting inward pressure against the upper portions of the same, a follower, means for moving the follower to and fro around the forward end of the divider, means for controlling the drop-leaves and guards, and means for extending bundles of grain on the platform in the path of the follower.

25. The combination of a harvester comprising binding mechanism, a shock-support arranged at the delivery end of the harvester to receive the bundles of grain discharged by the harvester, a follower movable on the support, and means controlled by the binding mechanism of the harvester whereby the follower is moved in different directions alternately and caused to dwell after each movement.

26. The combination of a harvester comprising binding mechanism, a shock-support arranged at the delivery end of the havester to receive the bundles of grain discharged by the harvester, a follower movable on the support, and a driving connection between the harvester and follower; said driving connection comprising means controlled by the binding mechanism of the harvester, whereby the follower is moved in different directions alternately, and caused to dwell after each movement.

27. The combination of a harvester comprising binding mechanism, a shock-support arranged at the delivery end of the harvester to receive the bundles of grain discharged by the harvester, a follower movable on the support, a miter-gear connected with the follower, a shaft connected by gearing with a shaft of the harvester, miter-gears $d\ d'$ loose on said shaft and intermeshed with the first-named gear and having inner ratchet-faces, a sleeve splined on the shaft and having complementary ratchet-faces, a keeper having a plurality of seats, a lever fulcrumed at an intermediate point of its length and connected at one end to the sleeve and having a slide and a roller thereon adapted to take into the seats of the keeper, a spring connected to said slide, a disk bearing cam-tappets alternately disposed in opposite directions and arranged to engage the inner end of the lever, a disk fixed with respect to the first-named disk and having spring-backed blades arranged to be engaged by the heel of the needle of the binding mechanism, and means for holding said disks against casual movement.

28. The combination of a harvester comprising a binding mechanism, a shock-support having spaces to receive sets of bundles of grain, means operated by the binding mechanism for receiving a recumbent bundle of grain from the harvester and standing the same on end on the shock-support, a follower on the support, and means controlled by the binding mechanism whereby the follower is moved in different directions alternately and caused to dwell after each movement.

29. A shocker comprising a support or platform, a vertical wall having a lateral arm, a drop-leaf at one side of the vertical wall, a guard hinged to and normally extending upwardly from the rear end of the drop-leaf, a resilient retainer for holding bundles of grain on the drop-leaf and exerting pressure against said bundles, a common means for normally holding the drop-leaf and guard in a horizontal position and an upright position, respectively, and a common means for releasing the same.

30. A shocker comprising a support or platform, a longitudinal central divider thereon having lateral projections at its rear, drop-leaves connected to opposite longitudinal edges of the platform, means for holding bundles of grain on the drop-leaves; said means comprising resilient bundle-pressing devices, guards connected in a hinged manner to and normally extending upwardly from the rear ends of the drop-leaves, guides for leading bundles of grain to the spaces at opposite sides of the divider or partition, a follower on the platform, means for moving said follower to and fro, a common means for normally holding the drop-leaves and the guards thereon in a horizontal position and an upright position, respectively, and a common means for releasing said drop-leaves and guards and permitting them to fall.

In testimony whereof I have hereunto set my hand in presence of two subscribing witnesses.

LEWIS E. McCAHAN.

Witnesses:
W. F. RANKIN,
O. H. KILBOURNE.